July 19, 1949.    M. O. WEBB ET AL    2,476,394
MOWING MACHINE
Filed April 17, 1945    2 Sheets-Sheet 2
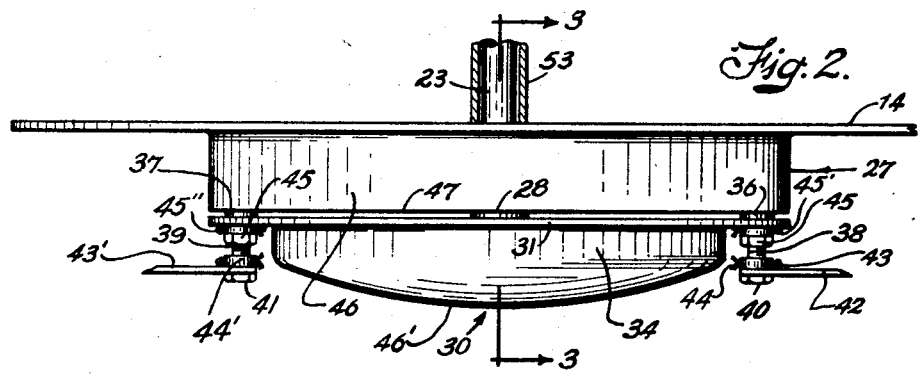
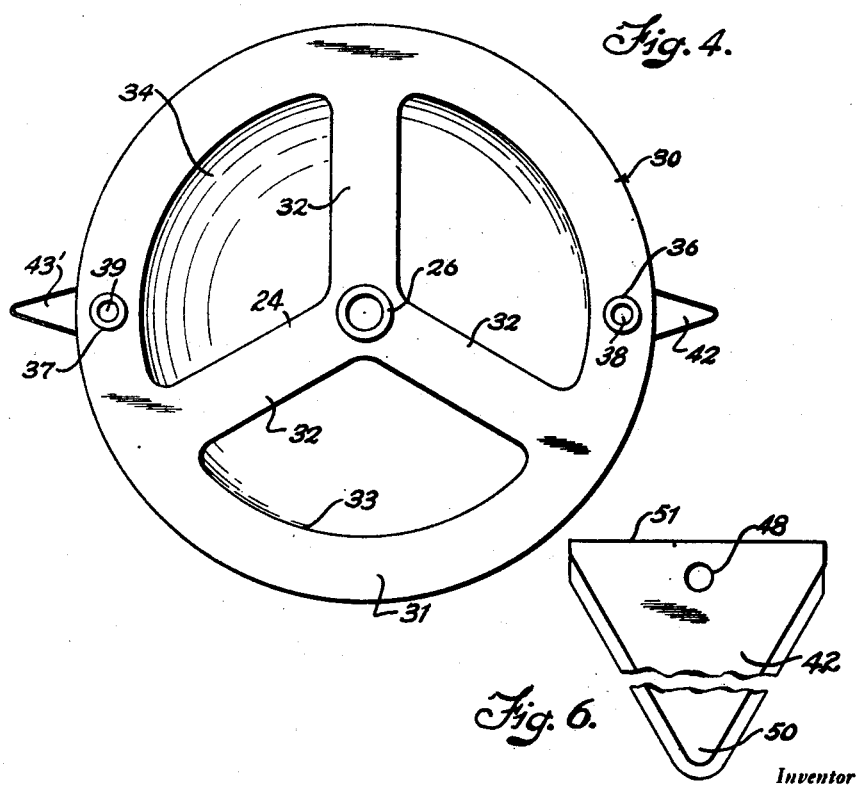
Inventor
Myron O. Webb.
Paul E. Webb.
By Clarence A. O'Brien
and Harvey B. Jacobson
Attorneys Patented July 19, 1949

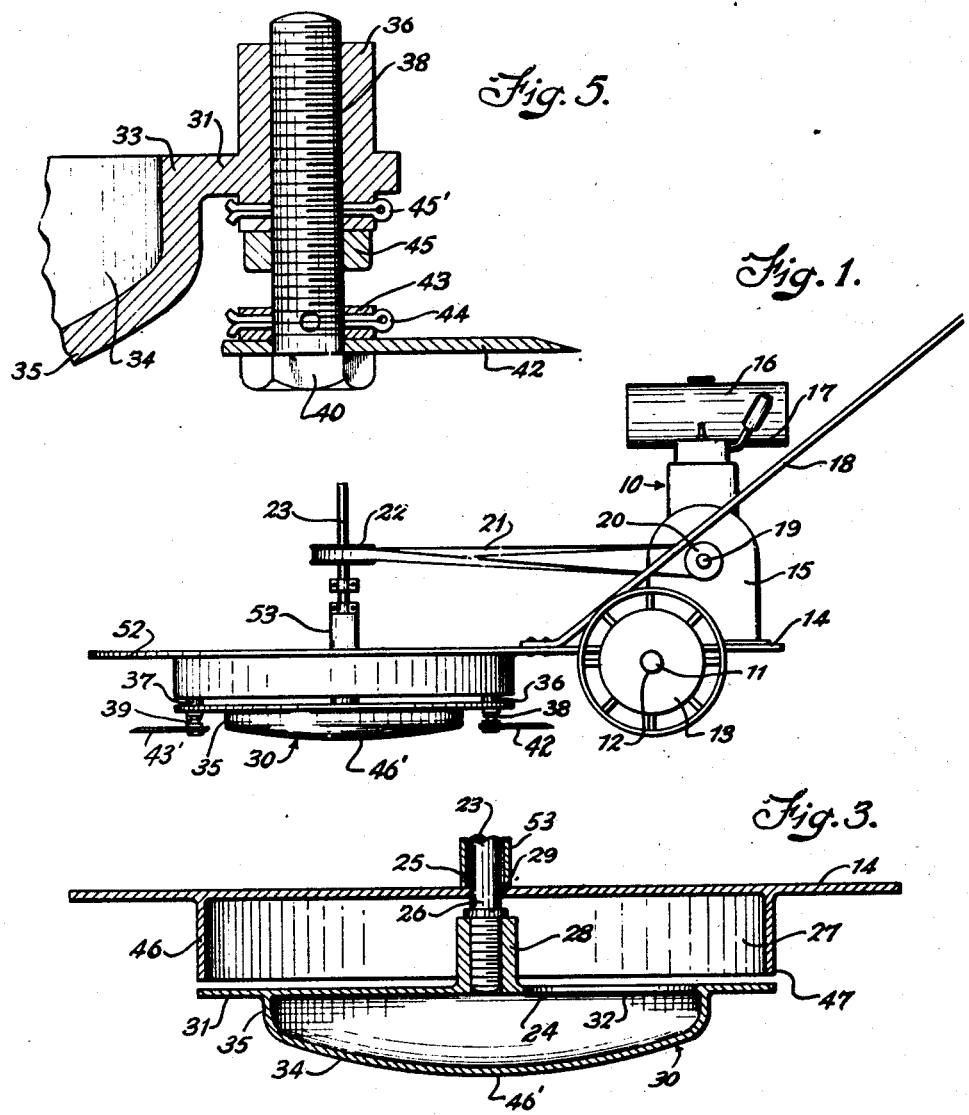

2,476,394

UNITED STATES PATENT OFFICE 2,476,394

MOWING MACHINE

Myron O. Webb and Paul E. Webb,
Arkansas City, Kans.

Application April 17, 1945, Serial No. 588,858

1 Claim. (Cl. 56—25.4)

Our invention relates to lawn or other mowers and has for an object to provide a practical, effective and inexpensive vertical shaft power drive mowing machine.

Another object of the invention is to provide a lawn mower through the action of which the cut grass will be thrown into windrows.

A further object of the invention is to provide a two-wheel vertical shaft operated revolving lawn mower.

And a still further object of the invention is to provide a lawn mower having a horizontally rotatable cutter and means carried thereby to guide the cutter over obstacles and limit the down movement thereof.

Other features and advantages will become more readily apparent from the following description and the accompanying illustrative drawings in which:

Figure 1 is a side elevational view of our mowing machine,

Figure 2 is an enlarged elevation of a rotor and drive shaft bearing member,

Figure 3 is a sectional view taken on line 3—3 of Figure 2,

Figure 4 is a top plan view of a rotor,

Figure 5 is an enlarged detail sectional view of an adjustable cutter member and its support, and Figure 6 is a detail plan view of a cutter blade.

In the accompanying drawings as above enumerated and in the following specification, like characters of reference indicate like parts throughout and in which 10 indicates our mowing machine which comprises an axle 11 on the opposing ends 12 of which are rotatably mounted two wheels 13 (only one of which being shown). On the axle is fixed a platform 14 on which is supported a gasoline motor 15 and a gas tank 16 connected therewith by a feed pipe 17. To the platform 14 is attached a handle 18.

To the motor shaft 19 is keyed a sheave 20 for driving a belt 21 trained over a sheave 22 fixed on a vertical shaft 23. The front of the platform 14 is provided with a bore 25 through which the lower end 26 of the shaft 23 projects into the center of a depending drum 27, and is screw threaded into the boss 28 down to its fixed collar 29, said boss being a central projection of a rotor 30 in the form of a spider 24 with a rim 31 and connecting arms 32. Depending from the inner edge 33 of the rim 31 is a dome shaped guide member 34, the convex side 35 of which is turned down.

The rim 31 is provided with upstanding oppositely disposed bosses 36 and 37 internally screw threaded to receive the vertically adjustable bolts 38 and 39.

The heads 40 and 41 of these bolts support the cutter blades 42 and 43' which are fixedly secured to said heads by threaded clamp disks 43 and 44', respectively, which are secured in clamping position by cotter pins 44. Lock nuts 45 hold the bolts in adjusted position. Cotter pins 45' and 45'' are passed through the lower ends of the bosses 36 and 37 and through suitable openings in the bolts 38 and 39 to prevent rotation of the bolts in the bosses. The rotor 30 includes the members 31, 32, 34, 36, 37, 42 and 43, all of which are preferably formed integrally except for the members 42 and 43'.

The cylindrical wall 46 of the drum hangs down over the bosses 36 and 37 which are closely adjacent thereto and thus with the edge 47 of said wall sufficiently close to the rim 31 forms a stabilizer for the rotor to prevent any angular movement thereof, whereby an even, smooth cut of a lawn may be made. The heighth of the cut will be determined by the adjustment of the bolts 38 and 39. The apex portion 46' will not permit the blades of the rotor to actually contact the ground surface at any time. Larger stones or obstacles are readily passed over by raising the rotor through over-balancing the same by pressing down upon the handle 18.

In Figure 6 we illustrate the cutter blade 42 having a pivot bore 48 in the center on a line with the point 50 of the blade, and adjacent the back edge 51, thereof. In our experimental model of the invention we found that these blades 42, mounted to freely pivot on the bolts 38 and 39, to swing out through certifugal motion of the rotor gave better results than any power lawn mower we have tested. The rate of speed of the rotor throws the grass to one side in windrows. This mower will readily cut small hay crops such as alfalfa, etc.

A tubular bearing 53 is provided on the platform at approximately the center thereof for supporting the shaft 23. The edges 52 of the platform 14 extend out beyond the range of the blades 42 and 43' as a guard both to the blades and to shrubbery, persons, etc. with which the machine may accidentally come in contact.

A very important feature of this mowing machine is that the end 26 of the drive shaft 23 is fully protected from entanglement with grass, weeds, vines, etc., by the drum 27, whereby it becomes unnecessary to stop the machine ever so often to untangle such material from the drive shaft.

Having now described our invention that which we claim as new and desire to procure by Letters Patent is:

A mowing machine comprising a base, an axle mounted transversely therebelow, supporting wheels on the ends of said axle, a handle on said base, a source of power disposed on the rear end of said base, a vertically extending bearing collar extending through the forward end of said base, a driven shaft rotatively supported in said vertical bearing collar and being threaded on its lower end and provided with a fixed collar at the upper end of the threads, a pulley disposed on said shaft, and a second pulley operatively connected with said source of power, a belt connected between said pulleys, a depending drum fixed to said base concentrically of said driven shaft, a rotor spider formed with a central threaded socket which is threadedly disposed on the threaded lower end of said driven shaft until engaged by said fixed collar to lie in proximity immediately below said depending drum, internally threaded cutter blade supporting collars fixed to the peripheral edge of said spider, laterally extending cutter blades disposed between said cutter blade supporting collars, and means disposed in said cutter blade supporting collars and passed through said blades pivotally supporting said blades and for vertical adjustment with respect to said base, and a dome-shaped guard fixed on said spider for preventing contact of the cutter blades with the ground.

MYRON O. WEBB.
PAUL E. WEBB.

REFERENCES CITED

The following references are of record in the file of this patent:

UNITED STATES PATENTS

| Number | Name | Date |
| --- | --- | --- |
| 1,622,611 | Sera | Mar. 29, 1927 |
| 1,868,918 | Schenk | July 26, 1932 |
| 2,312,972 | Orr | Mar. 2, 1943 |
| 2,329,185 | Coddington | Sept. 14, 1943 |